June 7, 1955 N. HARTLEY 2,709,843
DEVICE FOR SUPPLYING TO A FOUNDRY SAND MIXER WATER
AND SAND IN AUTOMATICALLY PREDETERMINED
PROPORTIONS ACCORDING TO SAND TEMPERATURE
Filed March 29, 1952 7 Sheets-Sheet 2
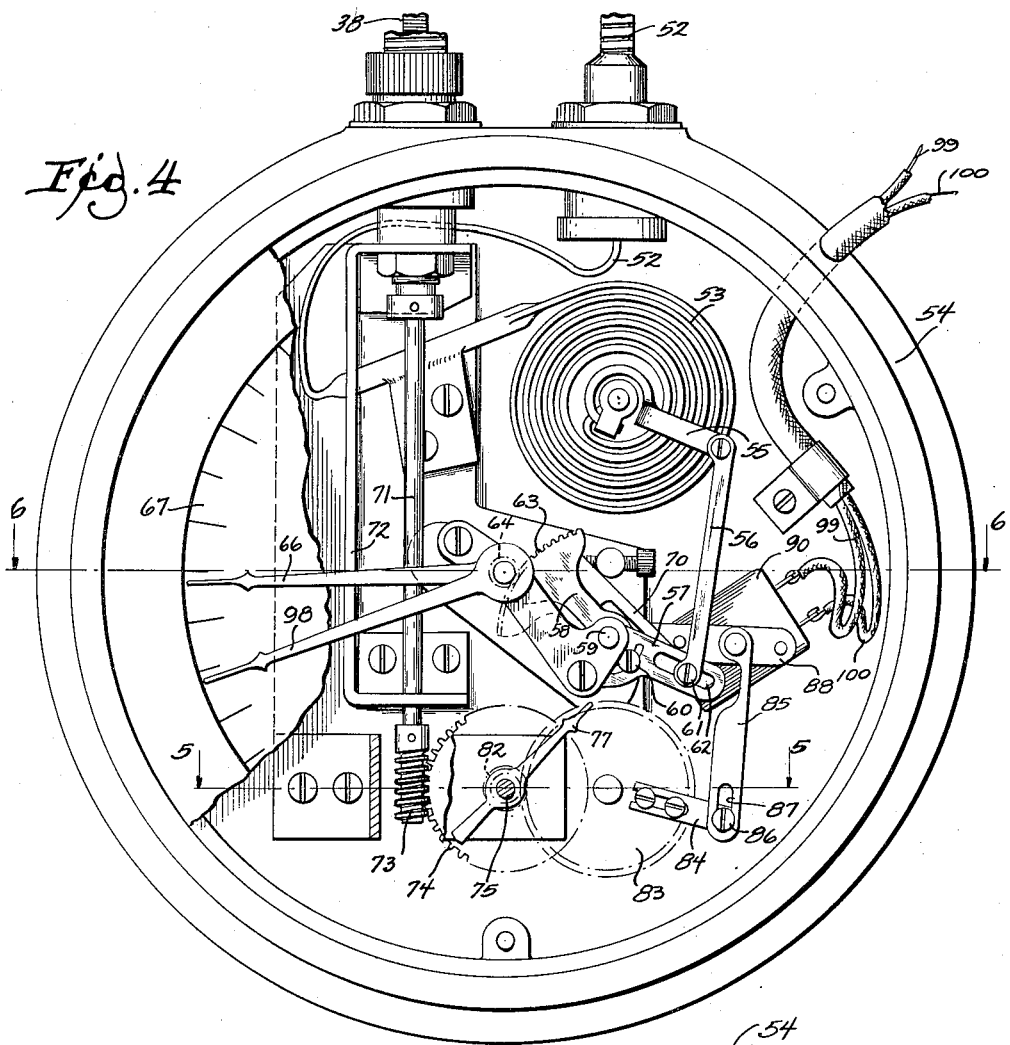
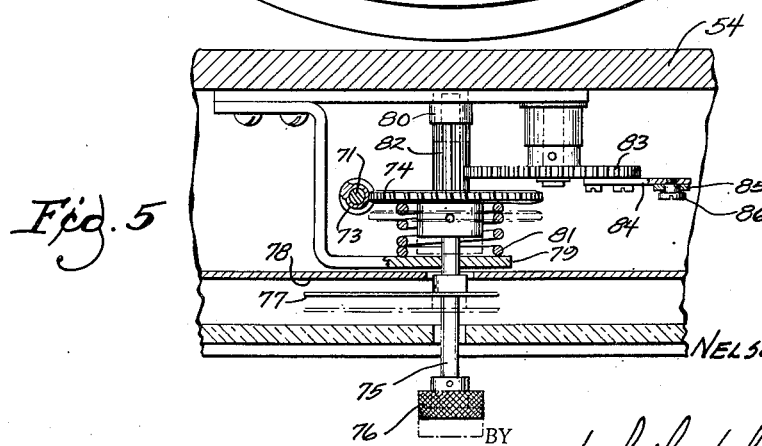
INVENTOR
NELSON HARTLEY
ATTORNEYS June 7, 1955 N. HARTLEY 2,709,843
DEVICE FOR SUPPLYING TO A FOUNDRY SAND MIXER WATER
AND SAND IN AUTOMATICALLY PREDETERMINED
PROPORTIONS ACCORDING TO SAND TEMPERATURE
Filed March 29, 1952 7 Sheets-Sheet 3

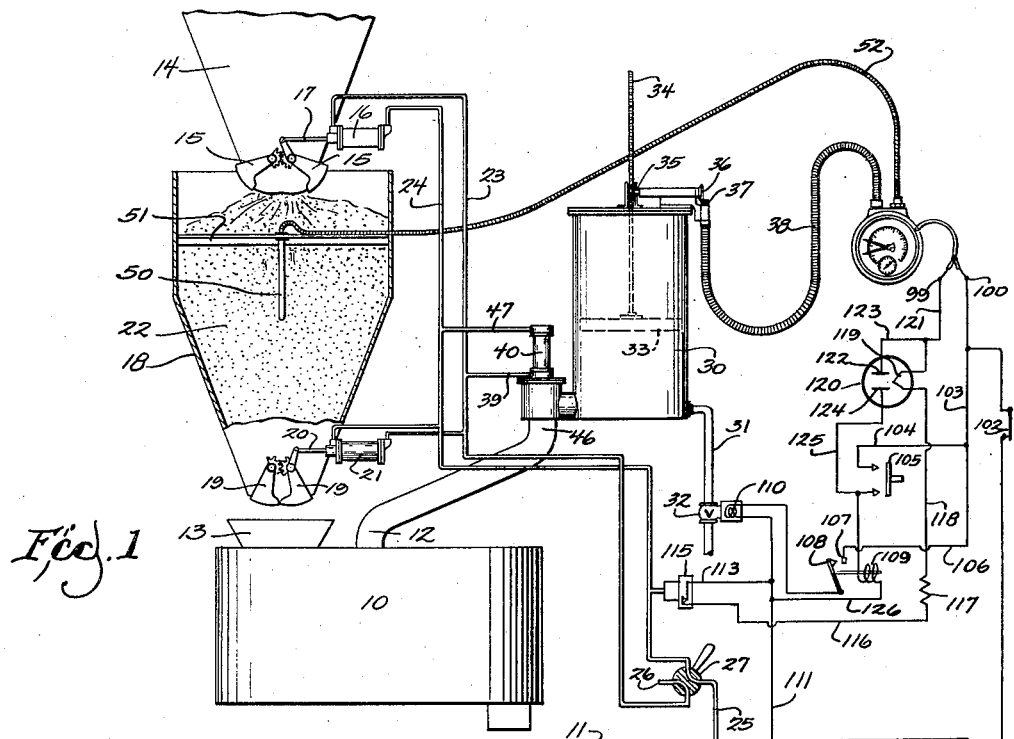

INVENTOR
NELSON HARTLEY

BY Wheeler, Wheeler & Wheeler
ATTORNEYS

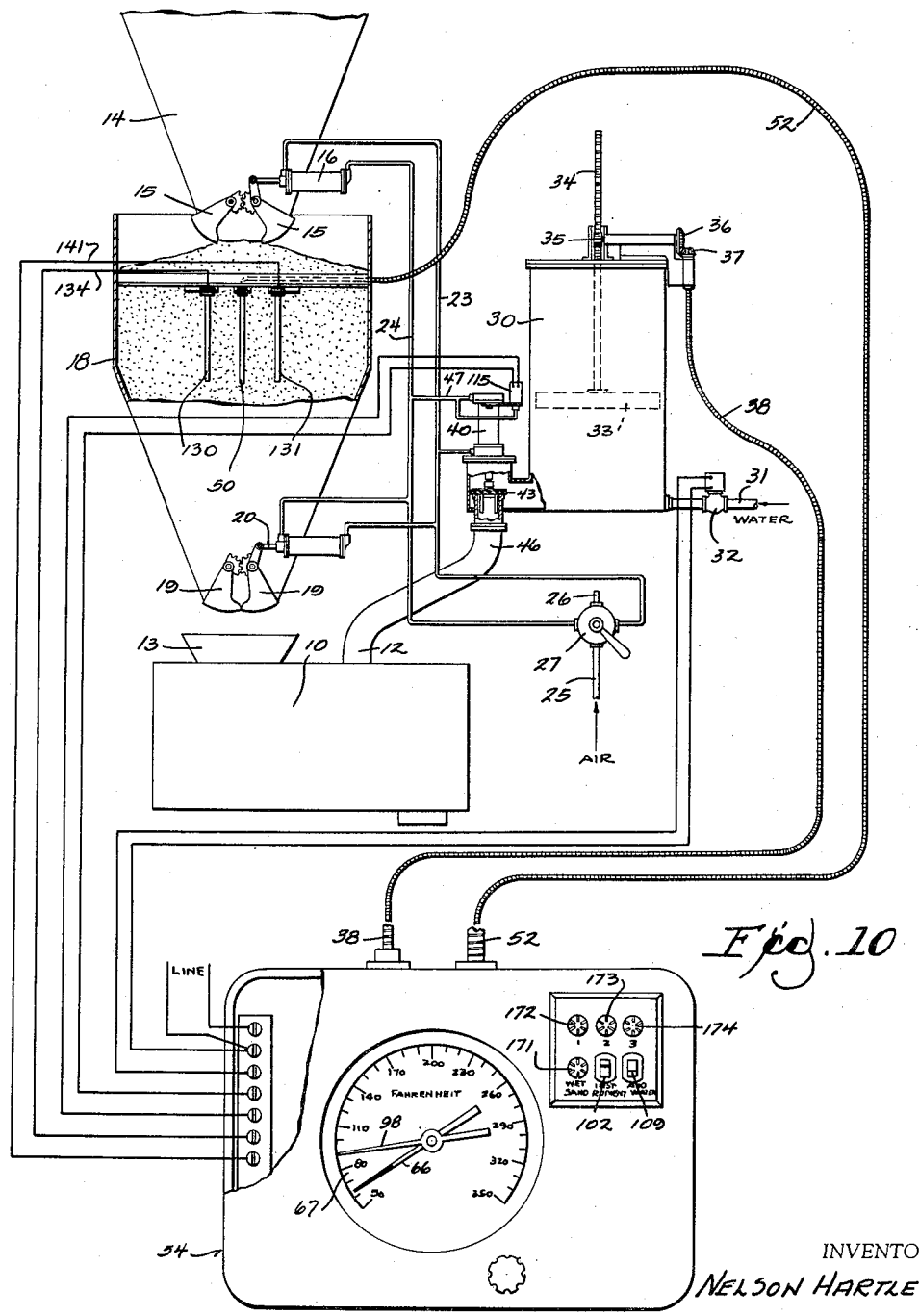

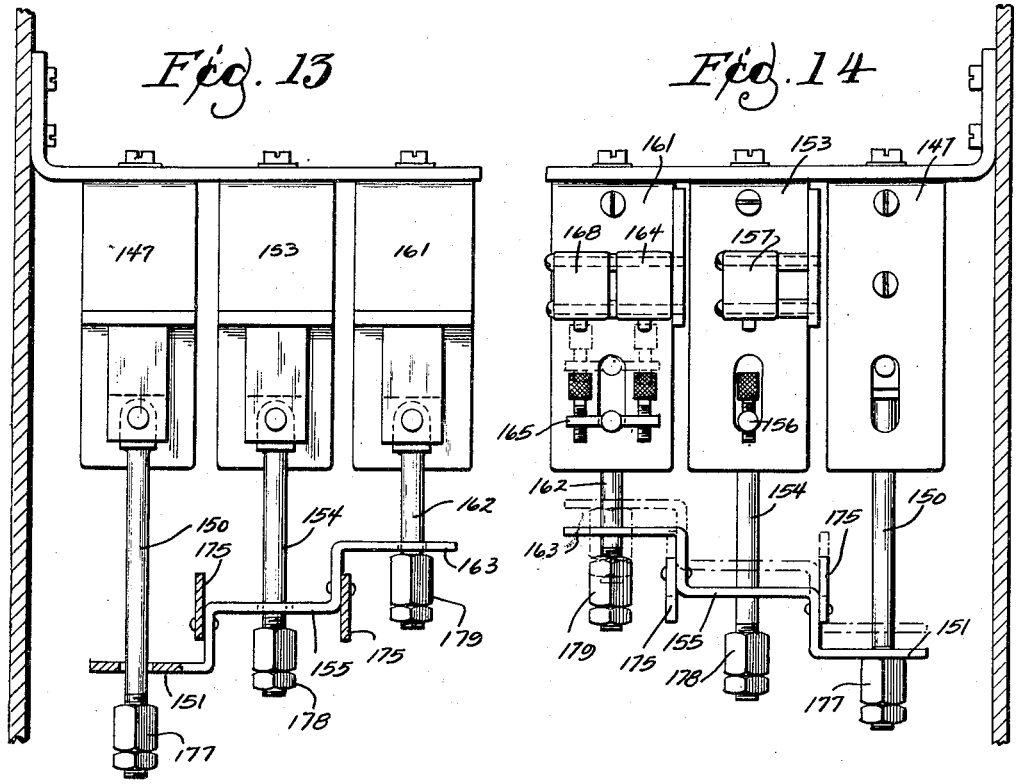

June 7, 1955   N. HARTLEY   2,709,843
DEVICE FOR SUPPLYING TO A FOUNDRY SAND MIXER WATER
AND SAND IN AUTOMATICALLY PREDETERMINED
PROPORTIONS ACCORDING TO SAND TEMPERATURE
Filed March 29, 1952   7 Sheets-Sheet 7

INVENTOR
NELSON HARTLEY

BY Wheeler, Wheeler, & Wheeler
ATTORNEYS

United States Patent Office 2,709,843
Patented June 7, 1955

2,709,843

DEVICE FOR SUPPLYING TO A FOUNDRY SAND MIXER WATER AND SAND IN AUTOMATICALLY PREDETERMINED PROPORTIONS ACCORDING TO SAND TEMPERATURE

Nelson Hartley, Baltimore, Md., assignor to Haylco Controls Corporation, Neenah, Wis., a corporation of Wisconsin Application March 29, 1952, Serial No. 279,369

27 Claims. (Cl. 22—89)

This invention relates to a device and method for predetermining quantities of ingredients according to diverse factors such as wetness and temperature. The device is particularly adapted to supply water and sand in automatically predetermined proportions to a foundry hand mixer. However, various alternative embodiments may be used for indicating the amount of water required to be added to a given batch of sand and cement and aggregate in making concrete, the determination being either indicated for a manually controlled mixing operation or used for the automatic control of the mixing operation.

In foundry sand mixers, a predeterminable minimum quantity of water must ordinarily be added to every batch of sand. If the water content of the returned sand is reasonably constant, the additional water required, over and above a predetermined minimum, depends solely upon the temperature of the sand in the batch. In my improved apparatus, while the mixer is in operation on one batch, I am able to measure out the sand required for the next batch and also separately to measure and hold available for delivery to the mixer a quantity of water which includes, over and above the prescribed minimum, an amount of water which is automatically related to the temperature of the measured batch of sand, the arrangement being such that the measured quantity of water and the measured batch of sand can be simultaneously dumped into the mixer.

If the water content of the returned sand is not substantially constant, I am able, in an alternative embodiment of the invention, to co-ordinate the amount of added water to the original water content of the sand, as well as to its temperature.

The used sand returned to the mixer may vary as much as 200° F. in temperature. It may also have wide variation in water content, since some of the returned sand may never have been used to make a casting, and other parts of the returned sand may come from portions of the mold which were not close enough to the casting to have all the water evaporate. My improved apparatus automatically responds to the sand temperature and water content and sets the elements of an integrating device which controls the flow of water into a water measuring tank. When the flow reaches a value determined by the integrating device, further water flow is arrested.

In the drawings:

Fig. 1 is a view largely in front elevation and partially in section which diagrammatically shows the entire organization.

Fig. 2 is an enlarged detail view in vertical section through the water measuring tank and the discharge valve therefrom.

Fig. 3 is a view in front elevation on a reduced scale showing a modified water measuring tank arrangement, which makes a discharge valve unnecessary.

Fig. 4 is an enlarged view partially in front elevation and partially in transverse section through the integrating device.

Fig. 5 is a view taken in horizontal section on the line 5—5 of Fig. 4.

Fig. 10 is a diagrammatic view partially in elevation and partially in section showing a modified arrangement in which the moisture of the returning sand, as well as its temperature, determines the amount of water automatically added.

Fig. 13 is a view taken on the line 13—13 of Fig. 11.

Fig. 14 is a view taken on the line 14—14 of Fig. 11.

Fig. 15 is a circuit diagram of the electrical connections used in the embodiment shown in Figs. 10 to 13, inclusive.

Figure 6:
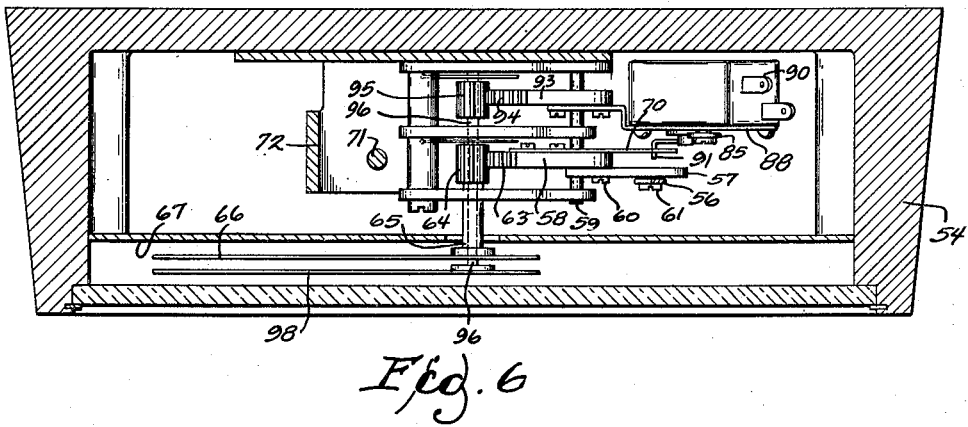
Fig. 6 is a view taken in horizontal section on the line 6—6 of Fig. 4.
Figure 7:
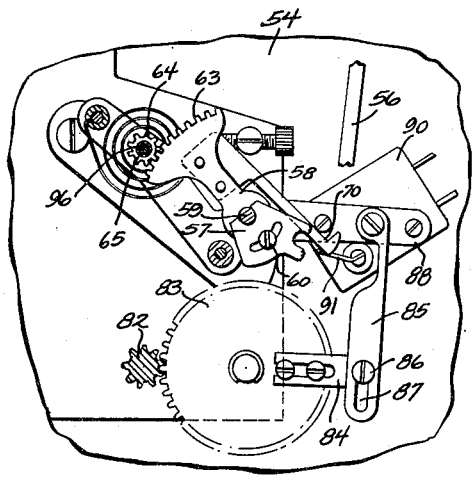
Fig. 7 is a view principally in front elevation and partially in section of the temperature responsive apparatus in the integrating device of Fig. 4.
Figure 8:
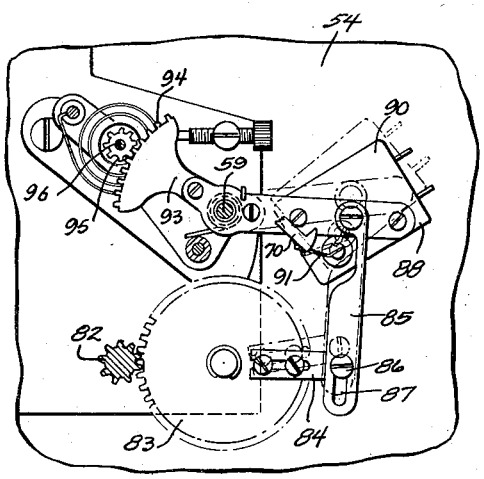
Fig. 8 is a view largely in front elevation and partially in section of the water volume responsive device in the integrating mechanism shown in Fig. 4.
Figure 9:
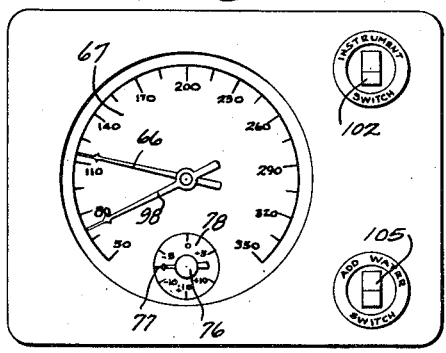
Fig. 9 is a view in front elevation on a reduced scale showing the control cabinet in which the integrating instrument of Fig. 4 is desirably mounted.

Assuming that the device is to be used for the integrated measuring of batches of sand and water for delivery to a foundry sand mixer, a conventional mixer has been shown diagrammatically at 10 arranged for discharge on to a conveyor 11. The mixer itself forms no part of the present invention. It is provided with a water inlet at 12 and a sand receiving hopper 13.

The previously used foundry sand, together with any increments required to make up losses, is stored in a storage bin 14, the discharge from which is controlled by the valves 15 which are intergeared and operated by a double-acting pneumatic cylinder 16, the piston rod 17 of which is connected to one of the valves.

Arranged to receive the sand discharged past valves 15 from the storage bin 14 is the measuring hopper 18, which may discharge directly into the sand-receiving inlet 13 of the mixer, subject to the control of valves 19 which are similar to valves 15, being intergeared and operated by the piston rod 20 of a double acting pneumatic cylinder 21. The discharge end of the storage bin 14 desirably extends into the measuring hopper 18 so that the delivery of sand will automatically cease when the level of the sand 22 in the measuring hopper 18 reaches the outlet of bin 14, regardless of the position of the valves 15.

The pneumatic actuating cylinders are supplied with air by means of pipes 23, 24 which are oppositely connected to the respective ends of the cylinders 16 and 21 so that the valves 15 and 19 will work in alternation, valves 15 being open when valves 19 are closed, and vice versa. The pipes 23, 24 are connected with the air supply line 25, and alternatively with the vent 26 by means of a rotary valve 27 which is diagrammatically shown in Fig. 1 and is manually operated, so that the operator in charge of the mixer can deliver to the mixer, whenever it is empty, a charge of sand 22 accumulated in the measuring hopper 18 while the previous charge is being mixed.

The water required for the addition of sand accumulated in the measuring hopper 18 is accumulated in the water measuring tank 30 from a water supply line 31 controlled by an electromagnetically operated valve at 32. A float 33 within the tank rises as the water enters the tank and communicates motion by means of rack 34 and pinion 35 through the beveled gears 36, 37 and flexible shaft 38 to an integrating device hereinafter to be described, whereby the flow of water is cut off when an amount has been stored in tank 30 which is properly correlated with the amount and temperature of the sand 22 in the measuring hopper 18.

When the air control valve 27 is manipulated to dump the sand, the water is pneumatically released from tank 30 and dumped into the water inlet 12 of the mixer 10. As shown in Fig. 2, this is accomplished by admitting air pressure from pipe 23 through branch pipe 39 to the air cylinder 40 to lift the piston 41, the rod 42 of which lifts valve 43 from its seat 44. The pins 45 with which the valve is provided, as shown in Fig. 2, are merely guides within the delivery pipe 46 to assure the proper resetting of the valve seat.

The large diameter of pipe 46 will be observed. I have found that if the water is introduced in small volume into the mixer, the wet sand will tend to encrust the walls of the mixer, whereas if the entire volume of water is dumped into the mixer as rapidly as possible, the walls of the mixer will tend to remain clean.

When all of the water and all of the sand has been discharged from tank 30 and measuring hopper 18 into the mixer 10, the operator will reverse the position of valve 27 to admit air to the pipe 24, whereby valve 19 will be closed and valve 15 opened. The air communicated through branch pipe 47 to the upper end of the air cylinder 40 will re-close the water valve 43 in the water measuring tank 30.

Fig. 3 shows an alternative arrangement whereby no outlet valve on tank 30' is required. The pipe 46' is provided with a gooseneck or trap which, at 48, is higher than the maximum water level of water to be measured in tank 30. Water will be held by gravity in the tank until the valve 27 admits air from the pressure line 25 to pipe 23. Thereupon the admission of such air through the branch pipe 39' to the interior of tank 30' creates a head upon the water in the tank which causes it to flow over the gooseneck 48 and down through pipe 46' to the mixer 10. The arrangement is regarded as equivalent to that shown in Fig. 1 and Fig. 2 in that it releases the water into the mixer substantially co-incidentally with the release of sand, and uses pneumatic pressure for that purpose.

The integrating apparatus now to be described measures the amount of water flowing into tank 30 to provide a primary amount which is independent of sand temperature and a secondary amount which is proportioned to sand temperature. In its preferred form, the apparatus comprises a dial with pointers so that the operator can observe the operation. The actual integration, however, is independent of the dial and of the pointers which are visible to the operator.

The instrument comprises a thermometer of the remote bulb type. The bulb 50 is supported on a cross member 51 in the sand measuring hopper 18 where it is exposed to the sand flowing into the hopper and to the sand which has accumulated therein. The bulb communicates through an armored tube 52 with a Bourdon tube 53 in the instrument case 54 shown in Figs. 4 to 6. At the end of the Bourdon tube is an actuating arm 55 connected by link 56 with a composite lever comprising parts 57 and 58, each of which is pivoted on the pintle 59, the two parts being adjustably connected for calibration purposes by means of a bolt 60. The pivotal connection between link 56 and lever element 57 is desirably made adjustable also, the adjustment being provided by making the pivot bolt 61 adjustable longitudinally of the lever in the slot 62.

The lever 57, 58 carries a segment 63 meshing with the pinion 64 on a quill shaft 65 which carries a pointer 66. The pointer 66 operates over a dial 67 which may be calibrated in terms of temperature. This is for the benefit of the operator. The actual integration, however, is performed by an integrating element which comprises a finger 70 connected with the lever 57, 58 as shown in Figs. 4, 6, 7 and 8.

The shaft 38 which is rotated by the movement of the float 33 within the water measuring tank 30 drives within the meter casing 54 a worm shaft 71 mounted in bearings in bracket 72 (Fig. 4) and carrying a worm 73 at its lower end. This worm meshes with the worm gear 74 mounted on a shaft 75 which projects from the casing and is provided with a knob at 76. Within the casing it carries a pointer 77 movable over a dial 78 which may be calibrated in gallons. Immediately behind the pointer, the shaft 75 is rotatably and slidably mounted in brackets 79, and at its rear end it is similarly mounted in bearing 80 fixed to the rear wall of the meter case. A compression spring 81 urges shaft 75 rearwardly in its bearings. Between bearing 80 and worm gear 74, this shaft carries a pinion at 82 meshing with a gear 83 which has an arm 84. This arm has a lost motion connection with link 85 by means of a bearing pin 86 screwthreaded into arm 84 and movable freely for the length of slot 87 with which the link 85 is provided.

The link, when the pin 86 reaches the end of slot 87, transmits motion to a lever 88 pivoted on the rod 59 and supporting a sensitive switch at 90 from which projects the oscillatory switch actuator 91 into the path of movement of the finger 70. The switch contacts (not shown) of switch 90 are normally closed and are opened by the actuator 91 when the actuator and the finger 70 are engaged as a result of the upward movement of the switch or the downward movement of the finger.

In order to give a visual indication of switch position, the lever 88 has an extension 93 which carries a segment 94 meshing with the pinion 95 on shaft 96. This shaft extends through the quill shaft 65 to the front of dial 67, where it carries a pointer 98. The position in which the pointer 98 registers with pointer 66 is the position in which the engagement of finger 70 and switch actuator 91 opens the circuit through switch 90.

Connected to the terminals of switch 90, as shown in Fig. 4, are conductors 99 and 100. The wiring circuit is diagrammatically included in Fig. 1.

In series in one side 101 of the line is the instrument switch 102, the opening of which opens the entire circuit. This switch connects with conductor 100 leading to the microswitch 90 within the instrument case. It also supplies through conductor 103 and conductor 104 a switch 105 which is manually operable to permit the operator to add water without reference to the integrating device. Another branch of conductor 103 leads via conductor 106 to the contact 107 of a relay which, when contact 108 is closed by means of solenoid 109, serves to energize the coil 110 of the electromagnetic valve 32, the return side of which is connected through conductor 111 with the other side 112 of the line.

A branch conductor 113 leads from conductor 111 through a pneumatic pressure switch 115 to conductor 116. In series therewith is a resistor 117 connected by conductor 118 with the filament 119 of an electronic tube 120. The other side of filament 119 is connected by conductor 121 with conductor 99 to be energized through the microswitch 90 in the instrument casing. One of the plates 122 of tube 120 is connected with conductor 121 by a branch conductor 123. The other plate 124 is connected by conductor 125 with one of the contacts of the manually operable switch 105 and also with the coil 109 which energizes the relay switch 108, 107. The coil 109 is then connected by conductor 126 back to conductor 111 and to the return side 112 of the line.

It is the purpose of the electronic tube 120 to provide a controlled delay in the admission of water into tank 30, to ensure that the finger 70, comprising the integrating element actuated by thermostatic bulb 50, will have time to reflect with accuracy the temperature of the sand 22 in the measuring hopper 18. The operation is as follows:

The operator first sets the device to predetermine what amount of water is to be added to a batch of sand regardless of temperature. He indicates this amount of water by pulling forwardly on the knob 76 to disengage the worm gear 74 from the worm 73. The length of pinion 82 permits this pinion to slide freely in mesh with its driven gear 83. With the worm gear disengaged from the worm, the knob is used to rotate shaft 75 to move the pointer 77 over the dial 78 until it indicates on the dial the number of gallons which are to be added regardless of temperature. The knob is then pushed in to re-engage the worm gear with the worm. The adjustment thus made will locate the driving pin 86 of the arm 84 on driven gear 83 at some intermediate point in the slot 87 as shown in Fig. 4. When the manually operable valve 27 is in the position shown in Fig. 1, whereby pressure is admitted to the line 24, to admit sand from the storage bin 14 into the measuring hopper 22, the pressure communicated to the pressure switch 115 closes a circuit through such switch and resistor 117 and the filament 119 of electronic tube 120 and thence through the normally closed contact of switch 90 to the other side of the line. The heating of filament 119 requires, in actual practice, about a half a minute, thereby allowing plenty of time for the thermostatic bulb 50 to reach the temperature of the sand admitted to the measuring hopper 18. The temperature of the sand, and the resulting response of the Bourdon tube 53 adjusts the lever 57, 58 and the integrating finger 70 to a given position which is indicated on the dial by the pointer 66.

As soon as the filament 119 of tube 120 heats up, current flowing between the plate elements 122 and 124 of the tube will energize the relay coil 109 to contact 108 to contact 107, thereby providing a power circuit to the coil 110 of the electromagnetic valve 32 to open such valve and allow the water to flow into the water measuring tank 30. As the tank fills, the motion of float 33 is communicated through the flexible shaft 38 to the instrument case where the worm 73 is rotated in mesh with worm gear 74 to move the pointer 77 back toward zero and to rotate gear 83. Not until the pointer 77 reaches the zero mark, thus indicating that the entire primary quantity of water has been delivered to the water measuring tank, is any motion communicated from the driving pin 86 at the end of arm 84 to actuate link 85. Up to this point, the pin 86 has been moving idly in slot 87.

When the entire predetermined quantity of primary water has been delivered into the tank, the pin 86 reaches the end of slot 87 and the link 85 is actuated to tilt the lever 88 and thereby bodily to move the switch 90. At the same time, the pointer 98 moves over the face of the dial toward registry with the temperature indicating pointer 66. When the two pointers register, the finger 70 connected with the temperature pointer will encounter the actuator 90 to connect with the link on switch 90 and thereby with the water volume pointer. The engagement of the integrating elements comprising finger 70 and switch actuator 91 opens the normally closed contacts of switch 90 to break the circuit to the relay, whereupon the electromagnetic valve 32 closes to cut off further flow of water.

The operator now has at his disposal a measured batch of sand and a batch of water which has been accurately measured by the integrating mechanism above described, to be the correct amount to provide primary moisture for the sand and to provide secondary moisture in proportion to sand temperature, whatever that may be.

This eliminates the skill heretofore required to proportion water and sand for a foundry mixture and enables even an unskilled operator to mix successive batches, regardless of sand temperature, to exactly the required consistency.

Despite automatic temperature control of secondary water, the embodiment thus far described requires manual presetting to determine the amount of primary moisture to be added. Particularly in the event that the moisture content has material fluctuation, it is appropriate to set the primary water supply automatically as suggested in Fig. 10 and other views presently to be described.

In the construction shown in Figs. 10 to 15, inclusive, electrodes 130, 131 are mutually spaced in the batch hopper 18 and are so connected in circuit with an indicating device or devices, and a suitable supply of current, that the electrical resistance of the sand between the electrodes will be measured as an index of its dryness. The wetter the sand, the greater will be its electrical conductivity and the smaller will be the amount of primary water required. Therefore, the electrical resistance of the sand is used to predetermine that amount of water which is supplied to the accumulating tank 30 prior to the addition of such water as is used to compensate for high temperature. Referring to the circuit diagram in Fig. 15, the secondary 132 of transformer 133 is connected by lead 134 with electrode 130. The other terminal of secondary 132 is connected through rectifier 135 to a relay coil 136. This coil is in series with relay coils 137, 138, and 139, which are similar except that they are wound to attract the respective armatures 140, 141, 142 and 143 at successively higher current flow. The conductor 141' connects the series-connected relay coils to electrode 131 so that when wet sand intervenes between electrodes 130 and 131 a circuit is completed from the secondary 132 of transformer 133 through the several coils.

When sufficient flow of current occurs to induce reaction of armature 140, the movement of this armature toward the coil 136 closes the circuit from the supply line 144 to contact 145, this being connected by conductor 146 to relay coil 147 and thence by conductor 148 to the other side of the supply line 149. Energization of coil 147 attracts the solenoid armature 150 into engagement with step 151 for actuation of lever 175 (Fig. 11) with results hereinafter to be described.

When the flow of current in electrodes 130 and 131 reaches a slightly higher value, such flow through the series connected coils 136, 137, 138 and 139 will cause armature 141 to be attracted by coil 137. This will close a circuit to contact 152 whereby in a manner similar to that already described, the relay coil 153 will be energized. In addition to lifting the armature 154 and step 155 of lever 175, such energization will cause an arm 156 of armature 154 to close a switch at 157 which connects line 158 with the conductor 159 between relay coils 136 and 137. The effect of this is to short the relay coil 136 out of the circuit, leaving only coils 137, 138, and 139 in series.

Similarly, a higher flow of current between the electrodes will cause armature 142 to respond to coil 138, thereby closing the circuit through contact 160 to relay coil 161 to attract the armature 162 to actuate step 163 of lever 175. Armature 162, in responding to the energization of its coil 161 closes a switch at 164 which shorts relay coil 137 out of the circuit, leaving only coils 138 and 139. Another arm 165 carried by armature 162 closes a switch at 168 which acts as a holding circuit for relay coil 161 to keep this coil energized even when coil 138 becomes deenergized.

The fourth relay coil 139 has a resistance such that its armature 143 is the last to be attracted. This armature does not respond during any normal functioning of the device, but in the event of a short circuit, or the presence of water in amounts exceeding that which the apparatus is capable of handling, the flow of current between the electrodes will become high enough so that armature 143 will be attracted to engage contact 170, thereby lighting the warning lamp 171. The several relay coils 147, 153, and 161 also have telltale lights at 172, 173, and 174, respectively, to give visual indication to the operator that the respective coils are functioning.

As clearly shown in Fig. 13, which shows the position of the parts with all of the coils 147, 153, and 161 de-energized, the respective nuts 177, 178, and 179 which are adjustable on the armature rods 150, 154, and 162, are normally spaced at different distances below the steps 151, 155, 163 of lever 175, thereby to provide different degrees of lost motion in the operation of the lever. The nut 179 is virtually in engagement with step 163, while nut 178 is spaced below step 155, and nut 177 has increased spacing below step 151. Thus, when armature rod 150 is elevated as shown in Fig. 14, it will actuate lever 175 sufficiently to increase the spacing between nut 178 and step 155 to approximately the same space which originally existed between nut 177 and step 151. The space between nut 179 and step 163 now corresponds substantially with the space between nut 178 and step 155 in the original deenergized position of the parts.

When coil 153 is now energized, its armature bar 154 will engage step 155 to raise it, and lever 175, to the dotted line positions of Fig. 14, thereby establishing full spacing between nut 179 and step 163. Thus the three armature bars, all having identical strokes will, upon being attracted by their respective solenoids, effect corresponding increments of travel of the lever 175, the lost motion compensating in each case for the fact that the three armatures must act successively on the same lever.

Figure 11:
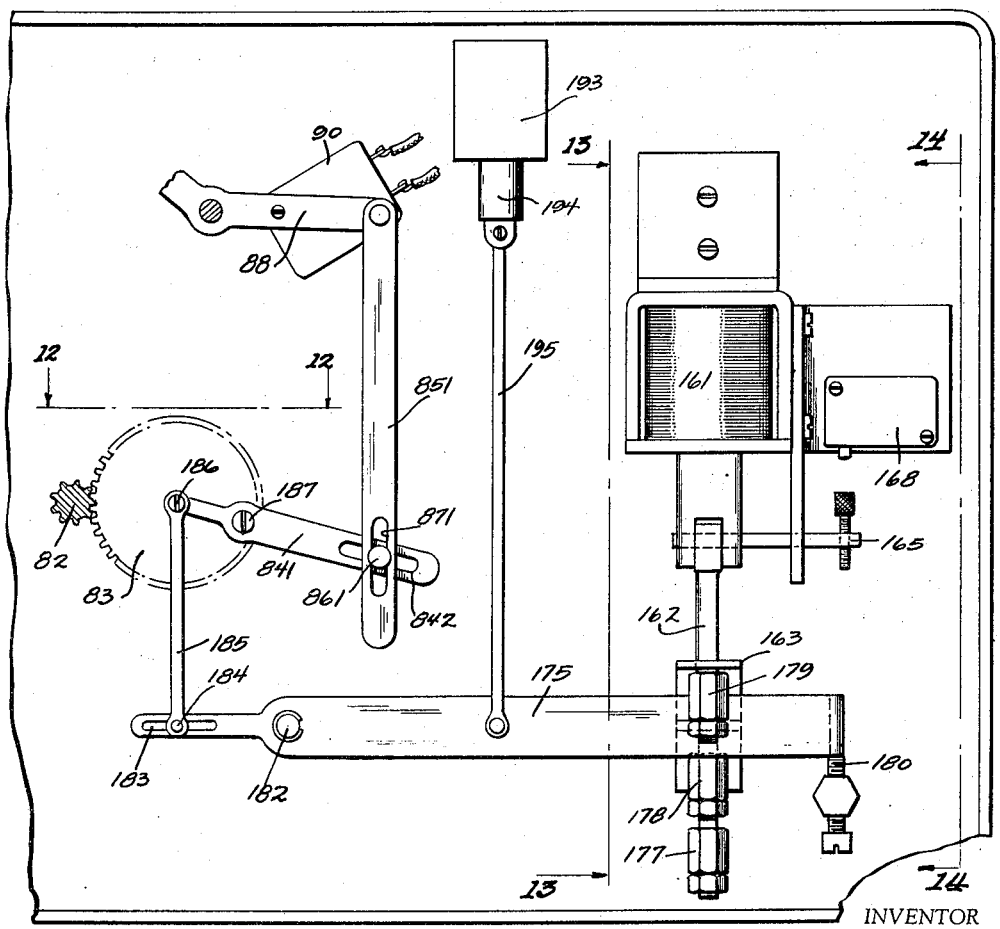
Fig. 11 is a view partially in side elevation and partially in section illustrating a train of driving connections used in the embodiment of Fig. 10.

As best shown in Fig. 11, the lever 175 has its initial position determined by an adjustable stop 180 from which the lever is upwardly oscillatable in the successive increments aforesaid about a pintle 182. Beyond the pintle, the lever is slotted at 183 for adjustment of pivot bolt 184 whereby link 185 is connected to lever 175. At its upper end, link 185 is connected by pivot bolt 186 with lever 841 which, instead of being fixed to gear 83 like the arm 84 (Fig. 4), is pivoted to the gear upon pivot bolt 187. It will be remembered from the previous description of the device shown in Fig. 4 that float operated driving connections rotate gear 74 and shaft 75, the latter carrying the pinion 82 shown in Fig. 12, as well as in Fig. 4 and Fig. 5. Thus, the oscillatory position of the segment or gear 83 is a function of the amount of water in the measuring tank 30. Assuming the lever 175 (Fig. 11) to be stationary, the rising of the float will transmit motion through pinion 82 and gear 83 to lever 841 to effect the same movement of such lever as if the lever were fixed to the gear 83, as is lever arm 84 in Fig. 4. The movement is the same because, in the assumed stationary position of lever 175, the pivot bolt 186 at the inner end of lever 841 substantially coincides with the axis of the gear or segment 83. Thus, in the to and fro movement of gear or segment 83, motion is communicated in the Fig. 11 device from the gear through lever 841 to link 851 to oscillate lever 88 and switch 90 exactly as previously described, movement also being communicated to the pointer 98.

Figure 12:
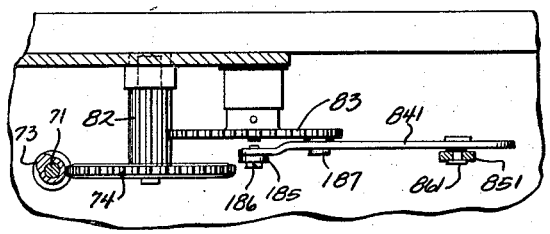
Fig. 12 is a detail plan view from the viewpoint indicated by the line 12—12 in Fig. 11.

The difference lies in the fact that whereas the gear 83 was, in the previously described construction, manually preset to determine the amount of primary water to be added, the presetting is now done automatically by the resistances and the electrical circuit above described, whereby the lever 175 is tilted from its deenergized position of Fig. 12 to vary the position of lever 841 respecting gear 83, and thereby to vary the datum position of switch 90, lever 88, and pointer 98. Ordinarily the resistance measuring circuit will have made the adjustment of the lever system preliminary to the introduction of water into the measuring tank 30 and the consequent response of the float and the float operated gear 83. However, the integrating action of the device is such that it makes no difference whether the electrical system functions prior to, or simultaneously with, the movement of gear 83; in either case the position of pointer 98 and switch 40 will be a function of the moisture that is in the sand and the water admitted to tank 30; and the effect, as in the manually set device, is to determine the amount of primary water which is added prior to the addition of secondary water to compensate for sand temperature.

In the device shown in Fig. 4, the pivot bolt 86 is adjustable in slot 87. In the present device, the pivot bolt 861 is not only adjustable in slot 871 of link 851, but also in the slot 842 of lever 841. This, together with the adjustment in radius of connection of link 185 with lever 175 provides very accurate control. Once the adjustment is determined, the device will accurately respond to water content of the sand to provide for the desired primary water. To prevent overrun, due to the abrupt action of the solenoids on lever 175, it is desirable to control the movement of lever 175 with a dash pot 193, the plunger 194 of which is connected by link 195 with lever 175.

Some of the features herein described are usable independently of others and for different purposes within the contemplation of the invention. As suggested in Fig. 16, the electrodes 130 and 131 may be used in a hopper 200 which contains sand at 201 for delivery to a concrete mixer 202. The electrodes are connected in circuit with any suitable current source 203 and a meter 204, the scale 205 of which may be calibrated in gallons. The position of the pointer 206 will be determined by the moisture already present in the sand 201, the pointer moving counterclockwise in response to an increase of moisture from minimum to maximum. Thus, assuming the scale 205 to show an increase in gallons in a clockwise direction, the effect of moisture already present in sand will be to reduce the reading on scale 205 of water to be added.

The operator can manually open and close the valve 207 to admit water from supply pipe 208 to the concrete mixer 202 until the water meter 209 shows that the number of gallons added is the number of gallons indicated by pointer 206 on scale 205, whereupon the operator will close valve 207.

Figure 17:
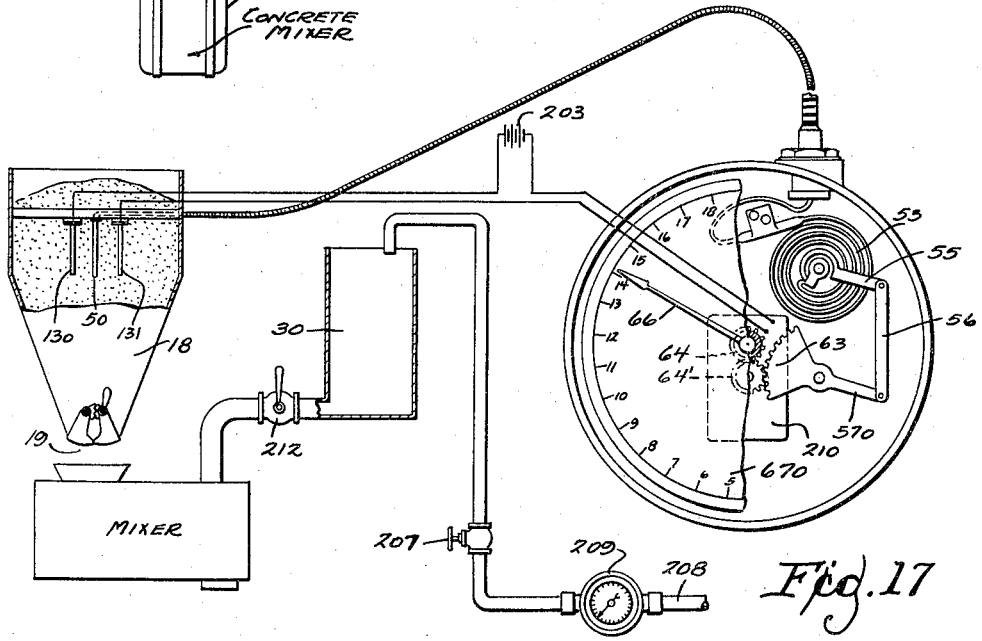
Fig. 17 is a diagrammatic view of a further modified embodiment of the invention.

A similar principle of manual control may be used for integrating temperature and initial water content as shown in Fig. 17, which may be assumed, for example, to be a foundry sand handling device. The hopper 18 is identical with that of Fig. 10, having a thermostat 50 and electrodes 130 and 131 and discharge valves 19. The thermostat 50 connects with Bourdon tube 53, the arm 55 of which is connected by link 56 with lever 570, as in Fig. 4. The segment 63 at the end of lever 570 meshes with pinions 64 and 64' to oscillate dial 670, bearing a scale calibrated in gallons or pounds. Pointer 66 is the indicating portion of milliammeter 210, which is connected in circuit between power source 203 and electrodes 130 and 131, as above described. The arrangement is such that dial 670 oscillates counterclockwise in response to an increase in temperature of thermostat 50, and pointer 66 likewise oscillates counterclockwise in response to an increase in current flow between electrodes 130 and 131, consequent upon high moisture content of the sand in hopper 18. Thus a high moisture content in the sand will reduce the water requirement shown by pointer 66 and dial 670, whereas a high temperature will tend to increase the water requirement shown by the cooperative action of the pointer and dial.

The operator manually controls valve 207 to deliver water from supply pipe 208 to an amount indicated by water meter 209, the water being delivered into a measuring tank 30 like that shown in Fig. 10 and Fig. 1 and Fig. 2. However, the discharge valve 212 from tank 30 may, in this instance, be manually controlled.

Figure 18:
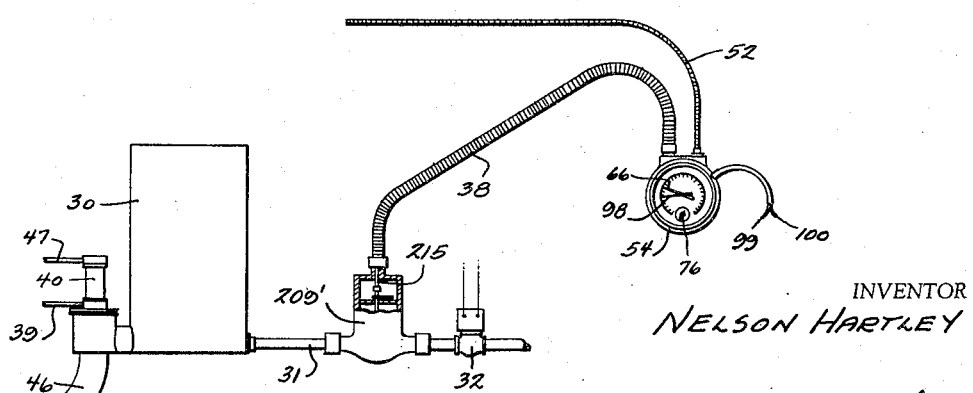
Fig. 18 is a diagrammatic view of another modified embodiment of the invention.

Fig. 18 shows a modification which may be incorporated either in the device of Fig. 1 or that of Fig. 10. Instead of measuring the water after it arrives in tank 30, it measures the water as it enters the tank by passing it through a meter 209', as in Figs. 16 and 17. In this instance, however, instead of requiring the operator to read the meter, the meter pointer shaft 215 is connected to the flexible shaft 38 leading to the integrating device. With the meter set to zero at the commencement of each operation, it will be evident that when a required amount of water has passed through the meter into tank 30, the operation of the flexible shaft will cut off the flow in the same manner as if the flexible shaft were driven by the float type meter 33, as above described.

Figure 16:
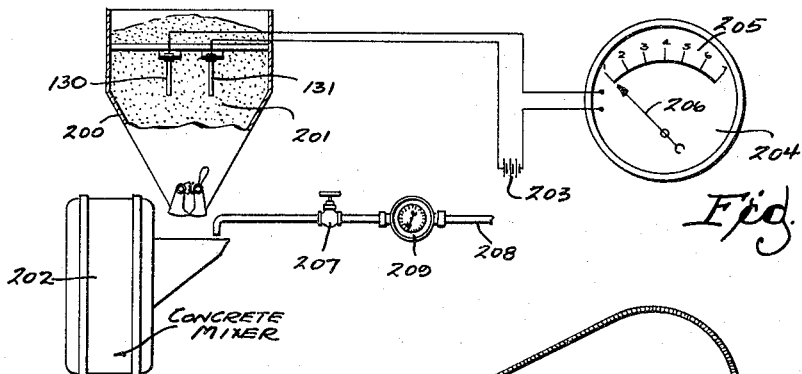
Fig. 16 is a diagrammatic view partially in side elevation and partially in section showing a modified embodiment of the invention.

While the completely automatic operation described in connection with Figs. 10 to 15, inclusive, and Fig. 18 is preferred, the devices of Figs. 16 and 17 will demonstrate the fact that the method involved may be practiced manually if desired. It is further intended to demonstrate, with particular reference to Fig. 16, that portions or all of the apparatus are useful for purposes other than foundry sand handling, it being intended that the various mechanisms may be employed in any combination for the handling of any appropriate material.

My improved method includes the measuring of the water content of sand as a guide to the amount of water to be added thereto, whether the sand is to be used for foundry sand purposes or for concrete or for other purposes. Where foundry sand is involved, my method further contemplates the use of two separate factors in determining the amount of water, the first being based on the water content already present in the sand and the second being based on the temperature of the sand. If the water content of the returning sand is fairly constant, the primary water may be added in fixed amount, the only variation being in the water which compensates for high temperature.

A further feature of the method invention, as applied to foundry sand, consists in the segregation of the measured water required for addition to a given batch of sand and the abrupt dumping of the measured batch of water abruptly into the mixture with the sand, as distinguished from the slow trickling of water into previously present sand. As noted above, I avoid incrustation of the mixer by accumulating the water in the process of measurement thereof and then dumping the measured batch of water into the sand. A most important advantage in the abrupt introduction of water is the immediate reduction of temperature of sand in the mix.

I claim:

1. In a device of the character described, the combination with measuring receptacles for first and second materials, of means for discharging said materials from said receptacles, and means for introducing into one of said receptacles a quantity of material dependent upon a characteristic of the material in the other receptacle and comprising valve mechanism for cutting off flow to said one receptacle, and operating means having integrating elements relatively movable into mutual engagement, a measuring instrument responsive to the said characteristic of the material in the second receptacle and connected to actuate one of said elements, and a quantity measuring instrument responsive to the amount of material in the one receptacle and connected to operate the other of said elements, and means operative upon the engagement of said elements to close said valve.

2. Means for measuring sand and water for subsequent mixing, said means comprising a sand container and a water container, a water supply connection to the water container provided with a control valve, a thermometer exposed to the temperature of sand admitted to the sand container, a water measuring device operatively associated with said water container, and means for closing said valve comprising an integrating device having integrating elements mounted for relative movement into engagement with each other, and actuating connections to one of said elements from said thermometer and to the other of said elements from said measuring device, said integrating device having valve shutting connections operative upon engagement of said elements.

3. The device of claim 2 in which the actuating connections from said measuring device to the other of said integrating elements include an adjustable lost motion device whereby a predetermined quantity of water may be admitted before the last mentioned element is actuated.

4. A device for measuring a batch of sand and a proportionate batch of water, said device comprising a sand container, a thermometer exposed to the temperature of sand therein, a water tank having a water supply connection and provided with an operatively associated water measuring means and with a shut off valve, electromagnetic means for valve actuation, and an electromechanical integrating device including a switch connected in circuit with said electromagnetic valve actuation means and comprising a first switch actuator connected with the thermometer to be driven thereby, and a second switch actuator connected to be driven from said measuring means.

5. The device of claim 4 in further combination with means for passing through said water supply connection a predetermined quantity of water independently of control of said integrating device.

6. The device of claim 5 in which the means for passing said last predetermined quantity of water comprises a lost motion device in the connection from said measuring means to the second integrating actuator.

7. The device of claim 5 in which the connections from said water measuring means to the lost motion device include separable driving and driven elements, the driven elements and said lost motion device being movable independently of the driving element when disconnected therefrom to predetermine the amount of lost motion.

8. The combination with a sand measuring hopper and a water measuring tank, of manually operable means controlling the filling and emptying of the hopper and the tank, the means which comprises the tank filling control including a valve, a float in the tank, a thermometer in the hopper, integrating elements having motion transmitting connections from the float and the thermometer respectively and mounted from movement toward mutual engagement, and a valve closing switch positioned to be actuated upon the engagement of said elements, the said valve having an electromagnetic operator in operative connection to be controlled by said switch.

9. In a device of the character described, the combination with a sand hopper and a water tank arranged for delivery to a foundry sand mixer and having delivery controlling means including a manually operable handle movable between delivery and non-delivery positions, of a water supply connection to the tank including a valve, a sand connection to the hopper including a valve, means whereby the manipulation of the handle to its non-delivery position effects the opening of said valves, and means for closing the water valve including an electromagnetic operator therefor, an electric switch controlling said operator and an integrating device comprising relatively movable integrating elements, one of which comprises an actuator for said switch, means mounting the switch and said last mentioned element for bodily movement, a float in the tank having motion transmitting connections to said switch for the bodily movement thereof, and a thermometer exposed to sand in said hopper and having motion transmitting connections to the other of said elements for the movement thereof, the engagement of said elements serving to energize said electromagnetic operator to close said water valve.

10. A device for measuring batches of sand and water for delivery to a foundry sand mixer, said device having a sand hopper having inlet and outlet valves connected for alternate opening movement and a water receptacle having discharge means connected to discharge water to said mixer coincidentally with the opening of the discharge valve of the sand hopper, a thermometer bulb exposed to sand in the hopper, a float in the water receptacle, a pipe leading to the receptacle and provided with a water valve having an electromagnetic operator, a valve closing switch having an actuator and operatively connected to control said operator, means mounting said switch for bodily movement with its said actuator, a motion transmitting connection from said float to said switch for the bodily movement of the switch and actuator, an integrating element in the path of movement of the actuator and also mounted for movement to and from the actuator, engagement of said element and actuator being adapted to effect operation of said switch, motion transmitting connections from said bulb to said element for effecting the movement of said element whereby to predetermine the point at which the element and actuator will engage for switch operation.

11. The device of claim 10 in which one of said motion transmitting connections is adjustable for predetermining the amount of relative movement between said element and actuator which will occur prior to such engagement.

12. The device of claim 11 in which a second switching means in series with the switch aforesaid comprises a time delay relay having connections with the operator for said water valve to open the valve at a predetermined interval after the thermometer bulb is exposed to sand.

13. The device of claim 10 in which the respective motion transmitting connections to said first switch and integrating element comprise pointers adapted to register upon engagement of said actuator and said element.

14. The combination with a sand hopper and a water tank having discharge valves and filling valves, of means for opening the filling valve of said hopper, inter-control means for initiating the opening of the filling valve of said tank upon the opening of the filling valve of said hopper, and means including an integrating device for independently closing the filling valve of said tank, a thermometer exposed to the temperature of sand in the hopper, a meter for measuring the liquid in the tank, said integrating device comprising relatively movable and mutually engageable elements respectively provided with motion transmitting connections from the thermometer and the meter, and means operative upon engagement of said elements to close the filling valve of the tank.

15. The device of claim 14 in which the motion transmitting connections from the meter to the integrating element actuated therefrom include an arm provided with a driving pin, a link having a slot in which said pin is movable, motion being transmitted to the last mentioned element when the pin reaches the end of the slot, and separable driving and driven elements for actuating said arm, said arm and driven element being movable independently of the driving element, while the driving and driven elements are separated, thereby permitting adjustment of the pin to a predetermined position in the slot, whereby a predetermined amount of water will pass said valve before said last mentioned integrating element is operated.

16. The device of claim 14 in which the motion transmitting connections to one of said elements includes a lost motion device, a gear train leading therefrom and having separable driving and driven members, the driven member being movable independently of the driving member when separated therefrom, whereby to effect a preliminary adjustment of the lost motion device, and a pointer connected with the driven member of the gear train and provided with a scale over which the pointer is adjustable in the movement of said driven member, whereby the extent of independent movement of the pointer is indicated.

17. The device of claim 16 wherein the separable driving and driven elements comprise a worm and worm gear, the worm gear being mounted upon a shaft provided with bearings in which it is axially movable as well as rotatable, and a pointer being carried by said shaft.

18. A device for measuring batches of sand and water for delivery to a foundry sand mixer comprising the combination with a sand hopper having a discharge control valve and a valved means for supplying sand thereto in predetermined quantity, of a water tank, valve means for controlling the discharge of water from said tank and provided with a common control with the means for controlling the discharge of sand from said hopper, said control being movable between discharge and non-discharge positions, a water supply line leading to said tank and provided with a valve, means operative upon the movement of said control to its non-discharge position for opening said valve, and means including an integrating device for closing said valve upon admission of a predetermined quantity of water to said tank, said integrating device having relatively movable integrating elements adapted for engagement, means for closing the valve upon the engagement of said elements, a water measuring device provided with motion transmitting connections to one of said elements, and a thermometer exposed to the temperature of sand in the hopper and provided with motion transmitting connections to the other of said elements.

19. The device of claim 18 in which the means for opening said water supply line valve is electromagnetic and includes a time delay relay, whereby the admission of water to said tank is deferred pending full response of said thermometer.

20. The combination with a batch hopper for sand and a tank for water, of a pair of spaced electrodes in the batch hopper in a position to be exposed to sand therein, a pipe leading to said tank, an electromagnetically operable valve controlling flow through said pipe, an electrical instrument and source of current supply connected in circuit with said electrodes for measuring electrical flow between the electrodes through the sand, a water measuring device having a movable integrating element connected to be operated therefrom, and a second integrating element connected with said electrical instrument, and mounted for movement thereby in opposition to the first element, said integrating elements having electrical contact means, said electromagnetic valve being connected in series with the contact means of said elements to be closed by engagement of said element contact means upon the arrival in said tank of an amount of water inversely proportional to the wetness of sand in said hopper.

21. In a device of the character described, the combination with a sand delivering hopper, of a sand dampness meter, a water accumulating tank having a water supply pipe provided with a cutoff valve, a quantity meter for water supplied to said tank, and integrating elements connected with the respective meters to be actuated thereby in opposite relative directions, the element connected with the water meter being moved in a given direction in response to an increase in water in said tank and the element connected with the wetness meter of the sand being arranged to move oppositely to the said given direction when the wetness of the sand is increased, electrical contacts carried by said elements and adapted for engagement in the opposite movement of said elements, and electromagnetic means electrically connected with the contacts and connected with the valve for closing the water supply valve upon such engagement.

22. The combination with a water accumulating tank, a valve controlled pipe for supplying water thereto, and a meter for water so supplied, of an integrating element mounted for movement and connected with said meter to be moved in a given direction according to the volume of water delivered to said tank, a second integrating element movable in opposition to the first element, said elements having electrical contacts engageable in the movement of said elements, a thermometer having a connection to the second integrating element for movement thereof in the same given direction according to an increase in temperature to which said thermometer is subject, an electrical current meter having a connection to one of said elements, a pair of spaced electrodes having a current supply connection in circuit with said electrical current meter, and a sand conduit in which said electrodes are exposed in mutually spaced relation as a means of measuring the wetness of sand in said conduit, the connection of said electrical current meter to the last mentioned integrating element being adapted to move said element in a direction to advance it toward the other integrating element, whereby to reduce the interval between said elements according to the wetness of sand in said conduit, and a valve closing means provided with an operating circuit including and controlled by the contacts of said elements and operative upon engagement of said contacts to close said valve.

23. In a device for adding water to foundry sand, an integrating instrument comprising relatively movable integrating elements and a switch having contacts actuated by said elements in the course of relative movement thereof in further combination with a sand hopper, measuring devices and a water accumulating tank, the said measuring devices respectively comprising a sand wetness gage including electrodes spaced in the sand hopper, a sand thermometer having a temperature responsive bulb exposed to sand entering the sand hopper, and a water meter responsive to the water admitted to said tank, said tank having a supply pipe and a shutoff valve controlling the admission of water to said tank through said pipe, said valve having electromagnetically operable control means with circuit connections including said switch contacts.

24. The combination with a sand hopper, of a moisture measuring instrument exposed to sand therein, a temperature measuring instrument exposed to sand therein, a first integrating element connected with the first instrument and mounted for movement in a given direction in accordance with sand moisture increase, and a second integrating element connected with the second instrument and mounted for movement thereby in the same given direction in the event of temperature increase, a water tank having an outlet for delivering water to the sand, a water pipe leading to the tank, a water supply valve in the pipe having an electrically operative control means, and an operating circuit for said control means including a switch actuated by the engagement of said elements.

25. The device of claim 24 in further combination with a rotatable dial peripherally provided with a scale graduated in terms of quantity of water and rotatably mounted in connection with one of said integrating elements, and a pointer cooperating with said scale and pivotally mounted in connection with the other of said elements.

26. In a device of the character described, the combination with a foundry sand feeder, of means for delivering water to the sand in predetermined relation to its existing moisture and comprising a water supply pipe with an electrically operable shut-off valve and further comprising a water measuring device having a movable integrating element, a moisture measuring device exposed to sand in the feeder and comprising a second movable integrating element, the first and second integrating elements being mounted for relative movement toward mutual engagement in response, respectively, to water supplied and to increased water content in the sand, switch contact means operated by engagement of said elements, and a circuit including said contact means and said electrically operable shut-off valve for closing said valve when said elements engage in consequence of said relative movement.

27. The combination with a water accumulating tank, a valve controlled pipe for supplying water thereto, and a volume responsive device for water so supplied, of an integrating device having linkage means mounted for movement and connected with said volume responsive device to be moved in a given direction according to the volume of water delivered to said tank, a second integrating device movable in opposition to said first device, an electric switch device having contacts, said first and second integrating devices being arranged to jointly actuate said electrical switch device, a thermometer having a connection to the second integrating device for movement in said given direction according to an increase in temperature to which said thermometer is subject, an electrical control means having a connection to said linkage means, a pair of spaced electrodes having a current supply connection in circuit with said electrical control means and a sand conduit in which said electrodes are exposed in mutually spaced relation as a means of measuring the wetness of sand in said conduit, the connection of said electrical control means to said linkage means being adapted to move said first integrating device in a direction to advance it toward the other integrating device, whereby to reduce the interval between said devices according to the wetness of sand in said conduit, and a valve closing means provided with an operating circuit including and controlled by the contacts of said electrical switch device and operative upon engagement of said contacts to close said valve.

References Cited in the file of this patent

UNITED STATES PATENTS

| | | |
|---|---|---|
| 1,628,915 | Robb | May 17, 1927 |
| 2,000,739 | Bristol | May 7, 1935 |
| 2,140,747 | Irwin | Dec. 20, 1938 |
| 2,174,729 | Schlack | Oct. 3, 1939 |
| 2,264,610 | Beardsley | Dec. 2, 1941 |
| 2,273,126 | McGillin | Feb. 17, 1942 |
| 2,435,281 | Jordan | Feb. 3, 1948 |
| 2,510,158 | Van Ackeren | June 6, 1950 |
| 2,518,998 | Reilly | Aug. 15, 1950 |
| 2,544,155 | Harkenrider | Mar. 6, 1951 |
| 2,549,603 | Horth | Apr. 17, 1951 |
| 2,593,327 | McIlvaine | Apr. 15, 1952 |

FOREIGN PATENTS

| | | |
|---|---|---|
| 600,210 | Great Britain | Apr. 2, 1948 |
| 621,181 | Great Britain | Apr. 5, 1949 |